May 22, 1962

R. L. AAGARD 3,035,441

INFRARED RADIOMETER

Filed Oct. 30, 1959

2 Sheets-Sheet 1

ROGER L. AAGARD,
Inventor

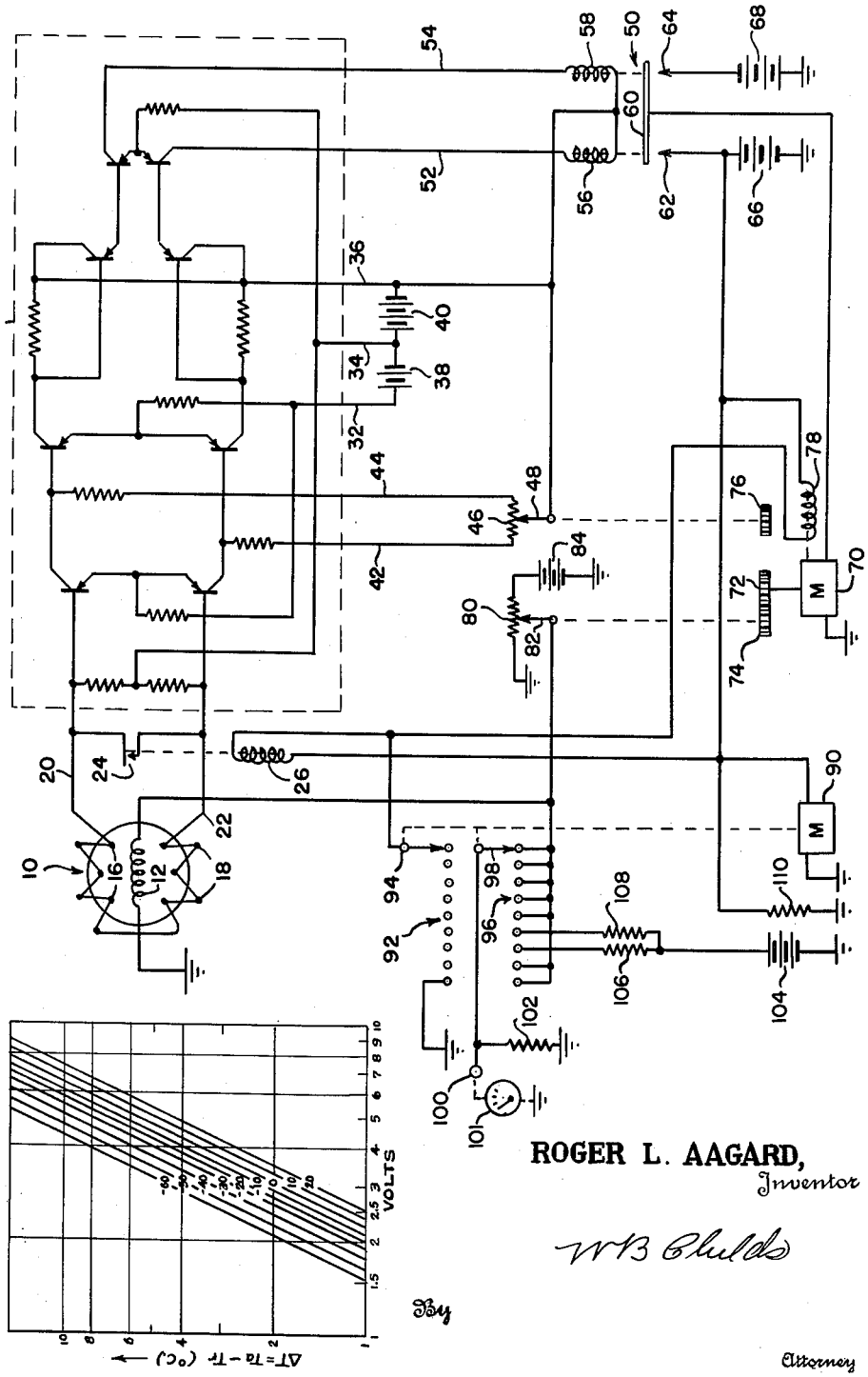

United States Patent Office 3,035,441
Patented May 22, 1962

3,035,441
INFRARED RADIOMETER
Roger L. Aagard, Minneapolis, Minn., assignor, by mesne assignments, to the United States of America as represented by the Secretary of the Navy
Filed Oct. 30, 1959, Ser. No. 850,095
4 Claims. (Cl. 73—170)

The present invention relates to radiometers, and more specifically, to an infrared radiometer for measuring the equivalent black body radiation temperature of its environment. Such devices are especially useful in making atmospheric radiation measurements.

Many devices have been used in the prior art to measure radiant energy. Many of these devices employ a black body to absorb the radiation. Resistors, thermistors, thermocouples or thermopiles are used to indicate the temperature of the body. These devices suffer from several disadvantages. The temperature of the body is affected by conduction of heat to or from the surrounding air, and variations in convection currents cause this conduction to vary. Where thermocouples or thermopiles are used the reference junction temperature must be known and the voltage output is affected not only by the difference in temperature between the "hot" and "cold" junctions, but also by the ambient temperature which affects the resistance of the thermoelectric materials and causes variations in the measurements. Complicated apparatus is required to compensate for these effects, and, notwithstanding such compensation, the devices must be accurately calibrated to take into consideration all of the variable conditions.

An object of the present invention is to provide a simple method of measuring equivalent black body radiation temperature.

A second object of this invention is to provide an infrared radiometer that is not affected by the surrounding air.

Another object of the invention is to provide a radiometer that does not require calibration of thermopile voltage output for ambient temperature.

A further object of this invention is to provide a radiometer detector having a high speed of response.

Still another object of the invention is to provide an extremely sensitive method of measuring radiation.

A still further object of the invention is to provide a radiometer detector of unique and simple construction.

Figure 1:
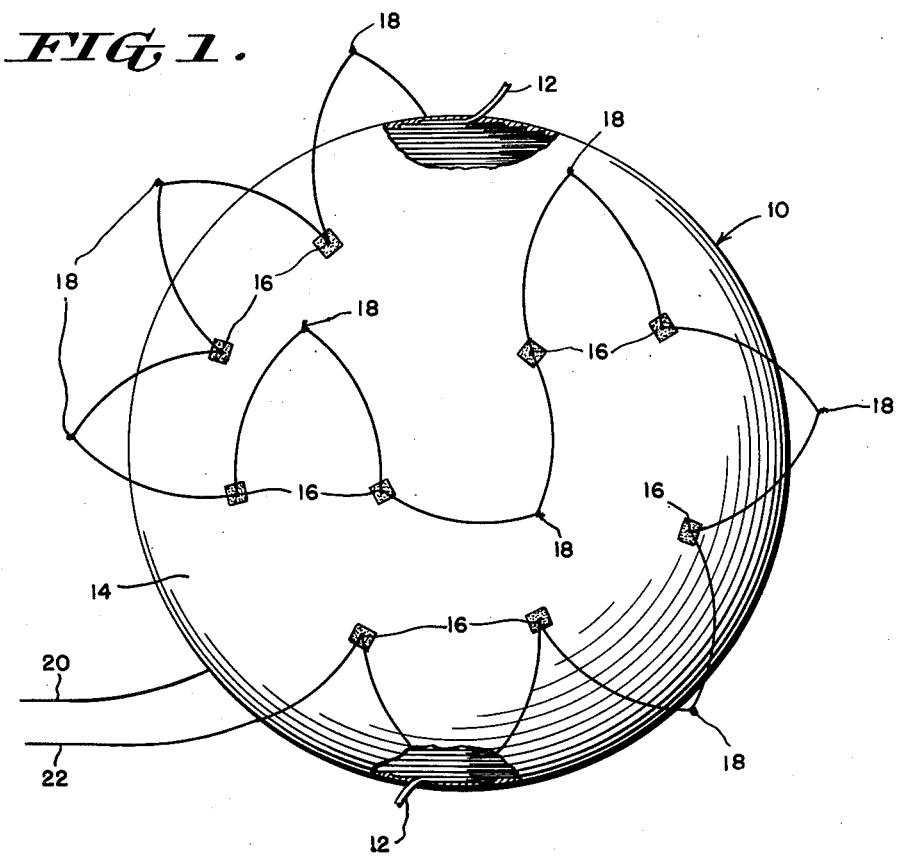
Figure 2:
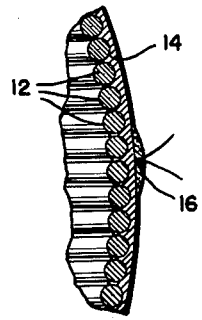

Other objects of the invention will become apparent from the following description of a preferred embodiment of the invention in connection with the figures, in which, FIG. 1 shows the structure of the radiometer detector of the present invention, FIG. 2 is an enlarged fragmentary sectional view showing a portion of the detector of FIG. 1, FIG. 3 shows the electrical diagram of the radiometer, and FIG. 4 shows a calibration curve for determining equivalent black body radiation temperature.

One of the conditions under which it is desired to determine the equivalent black body radiation temperature is in the atmosphere at night. Under these conditions the total radiation falling on a spherical black body is composed of radiation from different characteristic temperatures. Generally, the upward radiation received from the earth is from a characteristic temperature greater than the surrounding air, and the downward radiation from the sky is from a temperature less than the surrounding air. The equivalent black body radiation temperature is the fourth power average of these temperatures, and is usually less than the air temperature. Thus the radiometer detector is being warmed above air temperature on the under side and cooled below air temperature on the upper side, with the net effect being to tend to cool the detector below air temperature.

In the present invention the radiation temperature is measured by bringing the detector to the same temperature as the surrounding air and measuring the power necessary to maintain this condition. Since for any given temperature the radiation characteristics of the black body can be determined, the input power can be used to determine $\Delta T$, the difference between the air temperature and the radiation temperature, by the equation $$\Delta T = P/4\sigma\epsilon A T_0^3$$

which is called the static air temperature calibration equation and wherein:

$P$ = power supplied to the detector
$\epsilon$ = emissivity of the detector surface
$\sigma$ = Stefan-Boltzmann constant
$A$ = area of the detector surface
$T_0 = \dfrac{T_a + T_r}{2}$ $T_a$ = air temperature
$T_r$ = radiation temperature Since $\Delta T = T_a - T_r$, the radiation temperature is obtained by subtracting $\Delta T$ from the air temperature.

In the preferred embodiment of the radiation detector shown in FIGS. 1 and 2, a spherical body 10 comprises a spiral winding of thin resistive wire 12 one layer thick forming a spherical shell. Such a sphere can be constructed by winding two hemispheres of No. 36 enameled constantan wire on a hemispherically shaped surface approximately ½ inch in diameter. The wire is held together by some material such as flat black paint 14 of which the thermal emissivity is known. The two hemispheres are glued together and their windings connected in series to make a spherical body formed of a single layer of wire.

A thermopile comprising a plurality of series connected thermocouples is used to detect the temperature difference between the detector surface and the surrounding air. Alternate junctions 16 of the thermopile are affixed symmetrically over the surface of the sphere by means of cement, the intermediate junctions 18 being suspended in the air surrounding the sphere. Since an equal number of thermocouples measure the temperature of the detector surface and that of the surrounding air, the output of the thermopile across leads 20, 22 will be zero only when the surface temperature and the air temperature are the same.

Electrical power is supplied to the detector surface directly by passing current through the wire 12 which comprises the detector. It can be shown that the power per unit area is the same over the entire surface, thereby providing uniform heating.

The detector thermal time constant is the primary controlling factor in the speed of response of the instrument. It will be seen that the above described construction provides a surface having minimum mass per unit area. In addition, the means of heating the surface is both rapid and efficient. Thus, the present detector is uniquely adapted to provide a rapid and uniform response to radiation received from all directions.

FIGURE 3 shows the circuit diagram of a radiometer system embodying the detector of FIG. 1 to measure the radiation temperature of the atmosphere. The system shown is adapted to be carried aloft in a balloon and transmit its measurements via a radiosonde transmitter carried therewith. It will be apparent that much of the apparatus shown could be eliminated in taking measurements on the ground where direct access to the radiometer is possible.

The thermopile output at leads 20, 22 from detector 10 is fed to a high gain D.C. coupled amplifier, shown generally as transistor amplifier 30, having low input impedance for optimum matching to the thermopile. For the specific application this amplifier is constructed with component-to-component connections, without sockets or chassis, and encapsulated by casting in plastic resin. In order to increase stability and minimize thermal noise the encapsulated amplifier is submerged in ice water while the radiometer is in operation. Heat conduction to the amplifier is minimized by using No. 30 wire, protected by flexible plastic tubes, for all external connections.

Other connections from amplifier 30 are made through leads 32, 34 and 36 to batteries 38 and 40, which provide the amplifier power and bias voltages, through leads 42 and 44 to balancing potentiometer 46, and through leads 52 and 54 to coils 56 and 58 respectively of balanced relay 50. This relay has an armature 60 which selectively engages either of the two contacts 62 and 64 in response to change in the output of the amplifier. Contact 62 is connected to a source of positive potential 66 and contact 64 is connected to a source of negative potential 68, while armature 60 is connected to a reversible D.C. motor 70 which rotates in a direction dependent upon the polarity of its energizing voltage.

A pinion 72 fastened to the shaft of motor 70 is normally engaged with gear 74 which rotates the movable arm 82 of potentiometer 80. However, motor 70 is adapted to be moved physically by solenoid 78 to a second position where pinion 72 is disengaged from gear 74 and engages gear 76 which rotates the movable arm 48 of balancing potentiometer 46. Potentiometer 80 is connected across a battery 84 and provides current to the wire 12 to heat detector sphere 10, the amount of current being determined by the position of arm 82.

Operation of the system is as follows. Any difference between the temperature of the sphere 10 and that of the surrounding air results in a net voltage output from the thermopile at leads 20, 22, the polarity of this voltage being indicative of whether the sphere is warmer or cooler than the air. This voltage is amplified in amplifier 30, which has a gain of about $10^6$ and is sensitive to very small potentials at its input. Under normal conditions with zero voltage across leads 20, 22 the output currents to windings 56 and 58 of relay 50 will be equal and armature 60 will be balanced, contacting neither of the contacts 62, 64. If a voltage appears at leads 20, 22, the balance of the amplifier will be upset and will result in an increase in current through one of the relay coils and a decrease in current through the other coil. This will cause armature 60 to move into contact with either contact 62 or contact 64, depending upon the polarity of the input voltage, and energize motor 70 with voltage of one polarity or the other. The connections are so arranged that an input voltage of polarity due to the sphere 10 being cooler than the air will result in energization of motor 70 to drive contact 82 in a direction to increase the voltage applied to winding 12, thus increasing the current and causing more heat to be delivered to the sphere. A voltage of the polarity due to sphere 10 being too warm will, conversely, cause a decrease in current. The voltage at contact 82 will therefore be a measure of the power necessary to maintain sphere 10 at the proper temperature, and thus be an accurate indication of the equivalent black body radiation temperature.

In order to insure that zero input to the amplifier will result in a balanced output to relay 50, there is provided a shorting switch 24 controlled by solenoid 26 which is operated simultaneously with solenoid 78. When switch 24 is closed by solenoid 26, motor 70 is moved by solenoid 78 so that pinion 72 engages gear 76 to drive arm 48 of balancing potentiometer 46. Any unbalance in output at relay 50 will drive motor 70 in a direction to correct the balance.

In order to control the system and provide suitable outputs to a radiosonde transmitter a pair of multicontact rotary switches 92 and 96, driven by a slowly rotating motor 90, are connected in the circuit. One contact of switch 92 is grounded and its movable contact 94 is connected to the energizing circuit of solenoids 26 and 78, causing operation of the balancing circuit once each revolution.

Movable contact 98 of switch 96 is connected to output terminal 100 and grounded resistor 102. Most of the contacts of switch 96 are connected to contact 82 to provide output readings of its voltage. There is also provided for calibration purposes a source of standard voltage 104, which may be a mercury cell having a heater 110, and two resistors 106 and 108 of different values connected between source 104 and two contacts of switch 96. The values of resistors 106 and 108 are selected so that when they are connected to resistor 102 by contact 98 they will form voltage dividers having two different fixed voltage outputs in the range of voltages expected at contact 82. The current for operating heater 110, motor 90 and solenoids 78 and 26 may be derived from source 66 as shown. The radiosonde transmitter will convert the different voltages appearing at terminal 100 into different frequencies for transmission, or, if the device is used on the ground, a voltmeter 101 may be connected directly to this terminal. For stratospheric measurements, the radiosonde will also provide a measurement of the ambient air temperature by the usual means.

In the chart of FIG. 4, voltages are shown along the horizontal axis and values of $\Delta T$ are shown along the vertical axis. The sloping lines are plotted for different values of ambient air temperature. To use this chart, a line is drawn from the measured voltage, for example 4 volts, vertically to the measured air temperature, for example $-10°$ C. The value of $\Delta T$ is read opposite this point to be 4. The equivalent black body radiation temperature $T_r$ is therefore $T_a - \Delta T$, or $-14°$ C.

It will be seen from the foregoing description that a radiometer has been provided which is highly sensitive. It does not depend upon the measurement of the small voltage output from a thermopile, but only upon the existence of such voltage. The output voltage is in a range more easily measured, and the readings can be rapidly and accurately converted to equivalent black body radiation temperature by means of a simple calibration chart.

Obviously the invention is not limited to the single embodiment shown and described herein, but may be varied or modified within the scope of the following claims.

I claim:

1. A detector element for use in a radiometer, comprising a single layer of wire wound to form a spherical shell, a coating of black material of known emissivity on the surface of said sphere, a thermopile for detecting the temperature difference between said surface and the surrounding air, alternate couples of said thermopile being affixed to said surface, the intermediate couples remaining suspended in the air.

2. A radiometer comprising a detector having a single layer of wire formed into a spherical shell and coated with black material of known emissivity, a thermopile having alternate junctions affixed to the surface of said detector for providing an output dependent upon the temperature difference between said surface and the surrounding air, means for passing an electric current through said wire, means operated by said thermopile output for controlling said current to maintain said detector surface at the same temperature as said surrounding air, and means for measuring said current.

3. A radiometer comprising a spherical detector element of known emissivity, a thermopile having a plurality of junctions affixed to uniformly distributed points on the surface of said element and an equal plurality of junctions suspended in the air surrounding said surface, a source of energy connected to said sphere for heating the surface thereof, means controlled by said thermopile for regulating the amount of energy passing from said source to said surface so as to maintain said surface at the same temperature as said surrounding air, and measuring means connected between said source and said sphere to indicate the amount of energy passing from said source to said sphere.

4. The method of determining the equivalent black body radiation temperature of an environment unaffected by conduction or convection comprising the steps of exposing a black body to said environment, supplying energy to said black body at the same rate at which it is radiated therefrom to maintain its temperature the same as that of the surrounding air, and measuring the amount of energy supplied to said body.

References Cited in the file of this patent

UNITED STATES PATENTS

| | | |
|---|---|---|
| 2,685,795 | Hardy et al. | Aug. 10, 1954 |
| 2,768,527 | Stern et al. | Oct. 30, 1956 |
| 2,811,856 | Harrison | Nov. 5, 1957 |
| 2,837,917 | Machler | June 10, 1958 |